United States Patent [19]
Yuda

[11] 3,893,208
[45] July 8, 1975

[54] PLASTIC DEVICE FOR SPACING AND HOLDING TWO OR MORE PLATES

[75] Inventor: Takuo Yuda, Yokohama, Japan

[73] Assignee: Nifco Inc., Tokyo, Japan

[22] Filed: Feb. 28, 1974

[21] Appl. No.: 446,850

[30] Foreign Application Priority Data
Mar. 9, 1973 Japan............................ 48-28712

[52] U.S. Cl.................................. 24/73 P; 85/5 R
[51] Int. Cl.² ........................................ A44B 21/00
[58] Field of Search... 24/73 D, 73 P, 73 PF, 73 SB, 24/73 MS; 174/138 D; 85/5 R

[56] References Cited
UNITED STATES PATENTS

| | | | |
|---|---|---|---|
| 3,550,217 | 12/1970 | Collyer | 24/73 PF |
| 3,611,861 | 10/1971 | Schulze | 85/5 R |
| 3,688,635 | 9/1972 | Fegen | 24/73 PF |
| 3,733,655 | 5/1973 | Kolibar | 174/138 D |
| 3,777,052 | 12/1973 | Fegen | 24/73 P |

FOREIGN PATENTS OR APPLICATIONS

| | | | |
|---|---|---|---|
| 1,144,927 | 3/1969 | United Kingdom | 85/5 R |
| 1,134,247 | 11/1968 | United Kingdom | 85/5 R |

Primary Examiner—Richard J. Scanlon, Jr.
Assistant Examiner—Peter Nerbun
Attorney, Agent, or Firm—Robert W. Beart; Jack R. Halvorsen

[57] ABSTRACT

Disclosed is a plastic device for spacing and holding parallel plates. In use, the device is pushed by the finger and inserted into associated holes of the parallel plates. The device positively holds the parallel plates at regular spaces, exposing only its head and presenting a pleasing appearance.

3 Claims, 6 Drawing Figures

PLASTIC DEVICE FOR SPACING AND HOLDING TWO OR MORE PLATES

This invention relates generally to a spacer, and more particularly to a plastic device for spacing and holding two or more parallel plates.

Numerous plastic spacing-and-holding devices have been proposed. Such devices have a portion which is yieldingly deformed upon insertion into associated holes of the plates and resiliently returns to the original form after passing through the holes, thus positively holding the plates in a non-return way. Usually, such devices are moulded of a synthetic resin, such as nylon or polypropylene. As shown in Japanese Utility Model Publication No. 37,976/1972, the conventioned plastic spacing-and-holding device has fastener means integrally connected to opposite surfaces of an intermediate spacer member. In use, one fastener of the device is inserted in an associated hole of one plate and the other fastener of the device is inserted in an associated hole of the other plate. Disadvantageously, the ends of fasteners are exposed on the surfaces of the plates, presenting an unpleasant appearance.

The object of this invention is to provide a spacing-and-holding device which is simple in structure and easy in use and which presents a pleasing appearance.

In use, a spacing-and-holding device according to this invention is inserted in associated holes of parallel plates in one way, and only the small head portion of the device is exposed on the surface of the plate, presenting a pleasing appearance.

To attain this object there is provided according to this invention a plastic device for spacing and holding two or more plates comprising a head portion; at least two adjacent shank portions one of which has a relatively large cross-section and is integrally connected to and extending from said head portion and the other of which has a relatively small cross-section and is integrally connected to and extending from the aforesaid shank portion; a shoulder portion formed at the transition point between said adjacent shank portions; and a non-return portion integrally connected to each of said shank portions, said non-return portion being adapted to yieldingly deform in passing through an associated hole of said plate and return to its original form after passing through said hole.

This invention will be better understood from the following description of preferred embodiment which is made with reference to the accompanying drawings.

Figure 1:
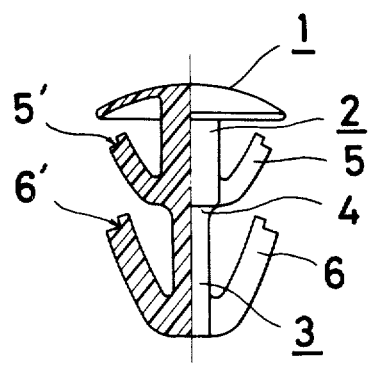
FIG. 1 is a side view, partly in section, of one embodiment of this invention.
Figure 2:
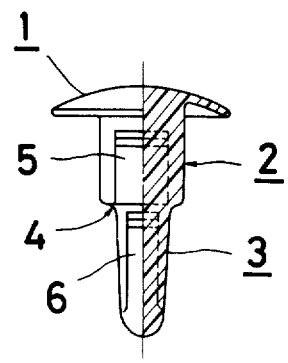
FIG. 2 is a similar view of the embodiment as seen from a different angle, that is, turned 90° about its vertical axis from the orientation shown in FIG. 1.
Figure 3:
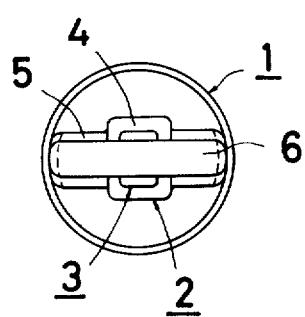
FIG. 3 is an end view of the embodiment as seen from the bottom.
Figure 4:
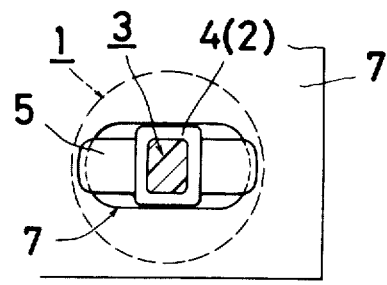
FIG. 4A shows the manner in which the upper plate is held.
FIG. 4B shows the manner in which the lower plate is held.

Referring to the drawings, 1 is a head formed in the shape of flat dome; 2 is an upper shank portion integrally connected to the head; and 3 is a lower shank portion integrally connected to and extending from the upper shank portion. The cross dimension of the upper shank portion is larger than the cross section of the lower shank portion so that the shank has a shoulder 4 at the transition point from upper to lower shank portion. In this particular embodiment both the upper and lower shank portions have a square cross section. The cross section of both shank portions may be circular.

Figure 5:
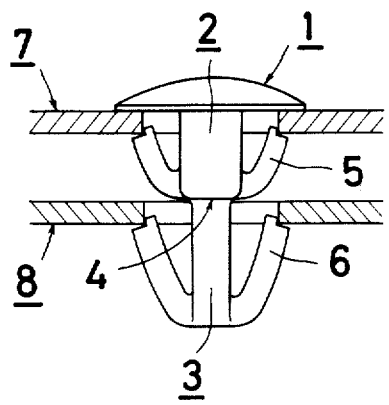
FIG. 5 shows, partly in section, the manner in which the upper and lower plates are spaced and held.
Figure 4:
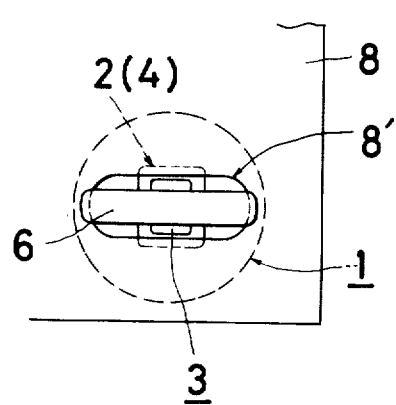

Alternatively, one of the upper and lower shank portions may be circular in cross-section, whereas the other shank portion may be square in cross-section, provided that the cross dimension of the upper shank portion is larger than the cross dimension of the lower shank portion. Two upper branches 5 are integrally connected to the upper shank portion 2, and likewise, two braches 6 are integrally connected to the lower shank portion 3. These branches diverge upward. In use, when the shank of the spacer is inserted into the aligned holes of two parallel plates, the branches of the spacer are yieldingly bent, thus allowing the spacer to pass through the holes, and when the full length of the shank is inserted in the associated holes, the branches return to the original form, thus preventing the spacer from slipping out of the holes of the plates. More specifically, when the shank of the spacer is inserted into the aligned holes 7' and 8' of two parallel plates 7 and 8, the branches 5, 5' are yieldingly bent, passing through the associated hole 7' of the upper plate 7 and returning to the original diverging form. The shank is inserted until the underside of the dome head 1 contacts the upper surface of the upper plate 7, and then the notched ends 5' of the branches catch the hole edge of the upper plate, as is best shown in FIG. 5. Thus, the upper plate 7 is positively held between the head 1 and the notched ends 5' of the upper branches 5 of the spacer under the influence of the resilient force which is generated in the deformed branches to cause them to return to their original form.

On the other hand, the shank is inserted until the shoulder projection 4 of the shank abuts against the upper surface of the lower plate 8, and then the notched ends 6 of the branches catch the hole edge of the lower plate 8, as is best shown in FIG. 5. Thus, the lower plate 8 is positively held between the shoulder projection 4 and the notched ends 6' of the lower branches 6 under the influence of the resilient force which is generated in the deformed branches to cause them to return to their original form. In this particular embodiment, the elongated upper hole is made broader than the elongated lower hole so that the upper hole allows the passage of the upper and lower shank portions, but the lower hole allows the passage of only the lower shank portion, stopping the upper shank portion. Thus, the upper and lower plates are spaced and positively held apart at a distance equal to the length of the upper shank portion in the longitudinal direction of the spacer. No part other than the dome head appears on the upper surface of the upper plate, presenting a pleasing appearance.

In this particular embodiment, a non-return fastener is provided in the form of a diverging branch. It should be, however, noted that the non-return means may take any other form if it is yieldingly bent in passing through the associated hole of a plate and if it tends to return to the original form under the influence of resilience. It may be made in the form of a slotted bulge as shown in FIGS. 6 to 12 of Japanese Utility Model Publication No. 37976/1972.

Also, the spacer according to this embodiment is described as having upper and lower branches to space two plates. If this embodiment is modified by providing additional branches and stepwise-thinning shank portions, three or more plates can be spaced and positively held.

What is claimed is:

1. A plastic fastener for spacing and holding two or more plates each having a slot-like aperture with a predetermined width, comprising: a head portion; at least two adjacent shank portions each having a predetermined length the first of which has a relatively large cross-section and is integrally connected to and extending from said head portion and the other of which has a relatively smaller cross-section and is integrally connected to and extending from said first shank portion; a shoulder portion formed at the transition point between said adjacent shank portions; and at least one non-return element integrally connected to said first shank portion at the end opposite said head portion and to said second shank portion at the end opposite said shoulder portion, each said non-return element having a free end with all such free ends extending toward said head and each being adapted to yieldingly deform in passing through an associated aperture of one of said plates and return to its original form after passing through said aperture, each said non-return element being a diverging branch whose free end has a shoulder to catch the edge of said associated aperture, each of said shank shoulder portions having a transverse dimension equal to or less than the predetermined width of the slot in the plate through which it must pass but larger than the predetermined width of the slot in the next adjacent plate whereby said plates are retained in predetermined spaced relation controlled by the predetermined lengths of said shank portions.

2. A plastic device according to claim 1 wherein said shank portion have a square cross-section.

3. A plastic device according to claim 1 wherein said shank portion have a circular cross-section.

* * * * *